United States Patent
Fukuda et al.

(10) Patent No.: US 6,965,308 B2
(45) Date of Patent: Nov. 15, 2005

(54) SYSTEM AND METHOD FOR OPERATING A PLURALITY OF POWER GENERATION STATIONS

(75) Inventors: Hiroshi Fukuda, Tokyo (JP); Toshihiko Tanaka, Kanagawa-ken (JP); Toshio Fujiwara, Tokyo (JP); Kanetoshi Nara, Saitama-ken (JP); Jin Murata, Kanagawa-ken (JP); Toshihiro Yamada, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 896 days.

(21) Appl. No.: 09/815,265

(22) Filed: Mar. 23, 2001

(65) Prior Publication Data

US 2003/0117278 A1 Jun. 26, 2003

(30) Foreign Application Priority Data

Mar. 23, 2000 (JP) .................................. 2000-082732

(51) Int. Cl.⁷ .............................................. G08B 29/00
(52) U.S. Cl. ...................... 340/506; 340/3.1; 340/511
(58) Field of Search .................... 340/506, 3.1, 531, 340/532, 538, 511

(56) References Cited

U.S. PATENT DOCUMENTS 5,400,246 A * 3/1995 Wilson et al. ................ 700/17

FOREIGN PATENT DOCUMENTS

JP         11-296206        10/1999

* cited by examiner

*Primary Examiner*—Daryl C Pope
(74) *Attorney, Agent, or Firm*—Foley & Lardner LLP

(57) ABSTRACT

A system for operating a plurality of power generation stations. The system comprises: a general control device for monitoring a plurality of power generation stations, each of the stations including at least one electric power generation unit; a plurality of unit control devices, each of which monitoring each of the generation units, the unit control devices producing alarm data; and communication means for exchanging data between the general control device and each of the unit control devices. Only part of the alarm data produced in the unit control devices are displayed at the general control device.

11 Claims, 20 Drawing Sheets

| Alarm date & time | Unit No. | Point ID | Point name | Alarm cond. information | Alarm level |
|---|---|---|---|---|---|
| 1999/1/11 13:59 | 1 | 1A059 | XXXXXXXXXXXX | >50 | 4 |
| 1999/1/11 14:01 | 1 | 1B156 | YYYYYYYYYYYY | >25 | 2 |
| 1999/1/11 14:10 | 1 | 1B000 | SSSSSSSSSSSS | <0 | 1 |
| 1999/1/12 00:03 | 1 | 1A087 | ZZZZZZZZ | >550 | 6 |
| ⋮ | ⋮ | ⋮ | ⋮ | ⋮ | ⋮ |

FIG. 3

| Alarm date & time | Unit No. | Point ID | Point name | Alarm cond. information | Alarm level |
|---|---|---|---|---|---|
| 1999/1/11 13:59 | 1 | 1A059 | XXXXXXXXXXXX | >50 | 4 |
| 1999/1/11 14:01 | 1 | 1B156 | YYYYYYYYYYYY | >25 | 2 |
| 1999/1/11 14:10 | 1 | 1B000 | SSSSSSSSSSSS | <0 | 1 |
| 1999/1/12 00:03 | 1 | 1A087 | ZZZZZZZZ | >550 | 6 |
| 1999/1/12 02:15 | 1 | 1A100 | Main steam temperature | >580 | 1 |
| ⋮ | ⋮ | ⋮ | ⋮ | ⋮ | ⋮ |

FIG. 4

<Alarm message>      <Alarm monitoring level threshold>

| Unit #1 | None | Unit #2 | None |
|---|---|---|---|
| Unit #3 | None | Unit #4 | None |

| | | | | |
|---|---|---|---|---|
| 1999/1/11 13:59 | 1 | 1A059 | XXXXXXXXXXXX | 76>50 |
| 1999/1/11 14:01 | 1 | 1B156 | YYYYYYYYYYYY | 26>25 |
| 1999/1/11 14:02 | 3 | 3B150 | UUUUUUU | 11<20 |
| 1999/1/11 14:02 | 2 | 2C000 | CCCCCCCC | ON |
| 1999/1/11 14:10 | 1 | 1B000 | SSSSSSSSSSSS | −11<0 |
| 1999/1/11 15:12 | 3 | 3A000 | PPPPPP | 52>50 |
| 1999/1/12 00:03 | 1 | 1A087 | ZZZZZZZZ | 596>550 |
| 1999/1/12 02:15 | 1 | 1A100 | Main steam temperature | 595>580 |

FIG. 5

```
<Alarm message>        <Alarm monitoring level threshold>

| Unit #1 | 3    | Unit #2 | None |
                       |---------|------|---------|------|
                       | Unit #3 | None | Unit #4 | None |

1999/1/11 14:01    1    1B156   YYYYYYYYYYYY         26>25
1999/1/11 14:02    3    3B150   UUUUUUU              11<20
1999/1/11 14:02    2    2C000   CCCCCCCC             ON
1999/1/11 14:10    1    1B000   SSSSSSSSSSSS         -11<0
1999/1/11 15:12    1    3A000   PPPPPP               52>50
1999/1/12 02:15    1    1A100   Main steam temperature   595>580
```

FIG. 6

```
<Alarm message>        <Alarm monitoring level threshold>

| Unit #1 | 1 | Unit #2 | None |
                       |---------|---|---------|------|
                       | Unit #3 | 1 | Unit #4 | None |

1999/1/11 14:02    2    2C000   CCCCCCCC             ON
1999/1/11 14:10    1    1B000   SSSSSSSSSSSS         -11<0
1999/1/12 02:15    1    1A100   Main steam temperature   595>580
```

FIG. 7

| Alarm date & time | Unit No. | Point ID | Point name | Alarm cond. information | Display suppression index |
|---|---|---|---|---|---|
| 1999/1/11 13:59 | 1 | 1A059 | XXXXXXXXXXXX | >50 | 0 |
| 1999/1/11 14:01 | 3 | 1B156 | YYYYYYYYYYYY | >25 | 0 |
| 1999/1/11 14:10 | 2 | 1B000 | SSSSSSSSSSSS | <0 | 0 |
| 1999/1/12 00:03 | 2 | 1A087 | ZZZZZZZZ | >550 | 0 |
| 1999/1/12 00:03 | 3 | 1D000 | PPPPPPPPPP | <-50 | 0 |
| ⋮ | ⋮ | ⋮ | ⋮ | ⋮ | ⋮ |

FIG. 10

| Alarm date & time | Unit No. | Point ID | Point name | Alarm cond. information | Display suppression index |
|---|---|---|---|---|---|
| 1999/1/11 13:59 | 1 | 1A059 | XXXXXXXXXXXX | >50 | 0 |
| 1999/1/11 14:01 | 3 | 1B156 | YYYYYYYYYYYY | >25 | 0 |
| 1999/1/11 14:10 | 2 | 1B000 | SSSSSSSSSSSS | <0 | 1 |
| 1999/1/12 00:03 | 2 | 1A087 | ZZZZZZZZ | >550 | 0 |
| 1999/1/12 00:03 | 3 | 1D000 | PPPPPPPPPP | <-50 | 0 |
| ⋮ | ⋮ | ⋮ | ⋮ | ⋮ | ⋮ |

FIG. 11

| Alarm information of Unit 1 | | |
|---|---|---|
| Alarm date & time | Point ID | Alarm cond. information |
| 1999/1/11 13:59 | 1A059 | >50 |
| 1999/1/11 14:01 | 1B156 | >25 |

| Alarm information of Unit 2 | | |
|---|---|---|
| Alarm date & time | Point ID | Alarm cond. information |
| 1999/1/11 14:10 | 2B000 | <0 |
| 1999/1/12 0:03 | 1B156 | Returning to Normal |

FIG. 13

```
Request for alarm display

1 : Units in starting/stopping operation phase
2 : Units in out-of-operation phase
3 : Units in normal operation phase Input a request number ( )
```

FIG. 14

| Unit No. | Starting/stopping operation phase deciding signal | Out-of-operation phase deciding signal | Rated operation phase diciding signal |
|---|---|---|---|
| Unit 1 | 1Z200 | 1Z201 | 1Z210 |
| Unit 2 | 2Z200 | 2Z201 | 2Z210 |
| Unit 3 | 3Z200 | 3Z201 | 3Z210 |
| Unit 4 | 4Z200 | 4Z201 | 4Z210 |

FIG. 15

| | |
|---|---|
| Common data | Number of units |
| Unit 1 data | Operation mode |
| | Name |
| | Licensed output power |
| | Display location |
| | Alarm data location |
| | Alarm decision logic number |
| | Output power data location |
| | Operation phase data location |
| Unit 2 data | Operation mode |
| | Name |
| | Licensed output power |
| | Display location |
| | Alarm data location |
| | Alarm decision logic number |
| | Output power data location |
| | Operation phase data location |
| ⋮ | ⋮ |
| Unit n data | Operation mode |
| | Name |
| | Licensed output power |
| | Display location |
| | Alarm data location |
| | Alarm decision logic number |
| | Output power data location |
| | Operation phase data location |

FIG. 17

| Display pattern No. | Condition 1 Operation mode  0: Base load operation  1: DSS,WSS  2: Seasonal | Condition 2 Alarm cond.  0: Normal  1: Alarm | Condition 3 Operation phase  0: Out-of-operation  1: In operation | Display specification | | |
|---|---|---|---|---|---|---|
| | | | | Shape | Color | Flicker |
| 0 | 0 | 0 | 0 | Shape 1 | Gray | No |
| 1 | 0 | 0 | 1 | Shape 1 | Green | No |
| 2 | 0 | 1 | 0 | Shape 1 | Gray | Yes |
| 3 | 0 | 1 | 1 | Shape 1 | Red | Yes |
| 4 | 1 | 0 | 0 | Shape 2 | Gray | No |
| 5 | 1 | 0 | 1 | Shape 2 | Green | No |
| 6 | 1 | 1 | 0 | Shape 2 | Gray | Yes |
| 7 | 1 | 1 | 1 | Shape 2 | Red | Yes |
| 8 | 2 | 0 | 0 | Shape 3 | Gray | No |
| 9 | 2 | 0 | 1 | Shape 3 | Green | No |
| 10 | 2 | 1 | 0 | Shape 3 | Gray | Yes |
| 11 | 2 | 1 | 1 | Shape 3 | Red | Yes |

FIG. 18

| | |
|---|---|
| Unit 1 | Data location of display parameter 1 in out-of-operation |
| | Data location of display parameter 2 in out-of-operation |
| | Data location of display parameter 1 in operation |
| | Data location of display parameter 2 in operation |
| Unit 2 | Data location of display parameter 1 in out-of-operation |
| | Data location of display parameter 2 in out-of-operation |
| | Data location of display parameter 1 in operation |
| | Data location of display parameter 2 in operation |
| ⋮ | ⋮ |
| Unit n | Data location of display parameter 1 in out-of-operation |
| | Data location of display parameter 2 in out-of-operation |
| | Data location of display parameter 1 in operation |
| | Data location of display parameter 2 in operation |

FIG. 19

| | |
|---|---|
| Unit 1 | Data location of display parameter 1 in alarm cond. |
| | Data location of display parameter 2 in alarm cond. |
| | Data location of display parameter 3 in alarm cond. |
| | Data location of display parameter 4 in alarm cond. |
| Unit 2 | Data location of display parameter 1 in alarm cond. |
| | Data location of display parameter 2 in alarm cond. |
| | Data location of display parameter 3 in alarm cond. |
| | Data location of display parameter 4 in alarm cond. |
| ⋮ | ⋮ |
| Unit n | Data location of display parameter 1 in alarm cond. |
| | Data location of display parameter 2 in alarm cond. |
| | Data location of display parameter 3 in alarm cond. |
| | Data location of display parameter 4 in alarm cond. |

FIG. 20

(Cont. on second sheet)

| | |
|---|---|
| Group 1 definition data | Number of displayed groups |
| | Shape No. of Group 1 |
| | Display location of Group 1 |
| | Name of Group 1 |
| | Unit 1 |
| | Unit 2 |
| | Unit 3 |
| | Unit 4 |
| Group 2 definition data | Shape No. of Group 2 |
| | Display location of Group 2 |
| | Name of Group 2 |
| | Unit 5 |
| | Unit 6 |
| | Unit 7 |
| | Unit 8 |
| | ⋮ |
| Group m definition data | Shape No. of Group m |
| | Display location of Group m |
| | Name of Group m |
| | Unit a |
| | Unit b |
| | Unit c |
| | Unit d |

FIG. 23

SYSTEM AND METHOD FOR OPERATING A PLURALITY OF POWER GENERATION STATIONS

BACKGROUND OF THE INVENTION

This invention is related to a system and method for operating a plurality of electric power generation stations.

In the prior art, a unit computer for monitoring and controlling a power generation unit receives process state data of the generation unit through a controller and/or a process input device periodically. The frequency of collecting the data is determined by the process frequency of the unit computer or depends on the process value. Operators of the generation unit computers monitor and control the generation units through monitor-controllers of the unit computers.

For example, digital and analog process data are inputted to the unit computers, and the data are displayed on the display devices at the generation units. The display may be schematic diagrams. When some process data are in an alarm condition, alarm massage is displayed at the display device or printed out.

The data related to the operation experience, performance and management of a generation unit are processed as logging items on the operation diary, and printed and displayed. The generation units are operated by the operators at the generation units in accordance with the power generation demands sent from the general power supply office over the telephone.

In the prior art described above, each generation unit has been always monitored and controlled by groups of operators taking turns. Although there is a demand for stable operation of power plants with fewer operators, further decrease in the number of the operators has been difficult, because the plant state data of each generation unit has been outputted at the controller and the computer of each unit and must be monitored and controlled separately.

Patent Abstract of Japan Publication Number 11296206 (Tokkai-hei-11-296206) discloses a power generating operation system including a general control device for monitoring and controlling a plurality of generation units. In the disclosed system, the general control device exchanges data with the generation units, and the operators at the general control device can stop each of the generation units in an emergency based on the exchanged data.

However, the operators at the general control device of the above-cited reference have to monitor many plant data of a plurality of power generation units at the same time since each generation unit has dozens of alarm data in general. Therefore, it has been difficult for the operators at the general control device to monitor and control the plurality of generation units.

SUMMARY OF THE INVENTION

Accordingly, it is an object of the present invention to provide an improved system and an improved method for operating a plurality of electric power generation stations especially when at least one power station is in an alarm condition.

There has been provided, in accordance with an aspect of the present invention, a for operating a plurality of power generation stations, the system comprising: a general control device for monitoring a plurality of power generation stations, each of the stations including at least one electric power generation unit; a plurality of unit control devices, each of which monitoring each of the generation units, the unit control devices producing alarm data; and communication means for exchanging data between the general control device and each of the unit control devices; wherein, only part of the alarm data produced in the unit control devices are displayed at the general control device.

There has also been provided, in accordance with another aspect of the present invention, a general control device for monitoring a plurality of power generation stations, each of the stations including at least one electric power generation unit having a unit control device, the general control device being connected to each of the unit control devices via communication means, the general control device comprising: means for setting an alarm level threshold for displaying only part of alarm data at the general control device, the alarm level threshold being dependent upon importance of the alarm data; means for sending an information indicating the alarm level threshold to each of the unit control devices via the communication means; means for receiving part of alarm data from the unit control devices, the part of alarm data being selected in the unit control devices from the alarm data produced in the unit control devices based upon the alarm level and the alarm level threshold; and means for displaying the part of alarm data at the general control device.

There has also been provided, in accordance with yet another aspect of the present invention, a general control device for monitoring a plurality of power generation stations, each of the stations including at least one electric power generation unit having a unit control device, the general control device being connected to each of the unit control devices via communication means, the general control device comprising: input means for stipulating at least one operation phase of the generation units to be displayed at the general control device; receiving means for receiving alarm data from the unit control devices via the communication means, the alarm data indicating data related to the operation phases of the generation units; means for selecting first part of the alarm data from the alarm data received by the receiving means; means for selecting second part of the alarm data from the first part of the alarm data based on the operation phases of the generation units corresponding to the operation phase stipulated by the input means; and means for displaying the second part of the alarm data.

There has also been provided, in accordance with yet another aspect of the present invention, a unit control device for monitoring a power generation unit, the unit control device being connected with a general control device via communication means, the general control device monitoring a plurality of power generation stations, each of the stations including at least one electric power generation unit, the unit control device comprising: means for setting an alarm level threshold for display at the general control device, the alarm level threshold being decided depending upon importance of the alarm data in view of the general control device; means for selecting part of the alarm data based on the alarm level; and means for sending the part of the alarm data to the general control device for display via the communication means.

There has also been provided, in accordance with yet another aspect of the present invention, a system for operating a plurality of power generation stations, the system including a general control device for monitoring a plurality of power generation units, the device comprising; means for storing current unit state data of the generation units, the state data being supplied from the generation units; means for storing fixed data of the generation units for display at the general control device; and display means for displaying the current unit state data including unit icons indicating the generation units at the general control device, the display means utilizing the store fixed data.

There has also been provided, in accordance with yet another aspect of the present invention, a method for operating a plurality of power generation units at a single general control device, the method comprising steps of: collecting alarm data at the power generation units; sending at least part of the collected alarm data to the general control device via communication means; selecting important part of the collected alarm data; and displaying the selected part of the collected alarm data at the general control device.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which:

FIG. 3 is an example of an alarm data table stored in the alarm data memory shown in FIG. 2;

FIG. 4 is an alarm data table at a time later than that shown in FIG. 3;

FIG. 5 is an example image displayed on the display device at the general control device shown in FIG. 1;

FIG. 6 is an example image displayed on the display device at the general control device a time later than that shown in FIG. 5;

FIG. 7 is an example image displayed on the display device at the general control device a time later than that shown in FIG. 6;

FIG. 10 is an example of an alarm data table stored in the alarm data selecting means shown in FIG. 9;

FIG. 11 is an alarm data table at a time later than that shown in FIG. 10;

FIG. 13 is an example of an alarm data table stored in the data memory shown in FIG. 12;

FIG. 14 is an example image displayed on the display device at the general control device shown in FIG. 12 when an operation phase of the generation units to be displayed at the general control device is inputted at the general control device;

FIG. 15 is a table showing an example of a set of spot information for deciding the operation phase of each of the generation units;

FIG. 17 is an example of a generation unit data table stored in the fixed data memory shown in FIG. 16;

FIG. 18 is an example of a display pattern setting table stored in the fixed data memory shown in FIG. 16;

FIG. 19 is an example of a table stored in the fixed data memory shown in FIG. 16 for defining detail display data based on operation phases;

FIG. 20 is an example of a table stored in the fixed data memory shown in FIG. 16 for defining detail display data based on alarm conditions;

FIG. 23 is a group definition table used in a sixth embodiment of the present invention using the operation system shown in FIG. 16;

DETAILED DESCRIPTION OF PREFERRED EMBODIMENT OF THE INVENTION

Figure 1:
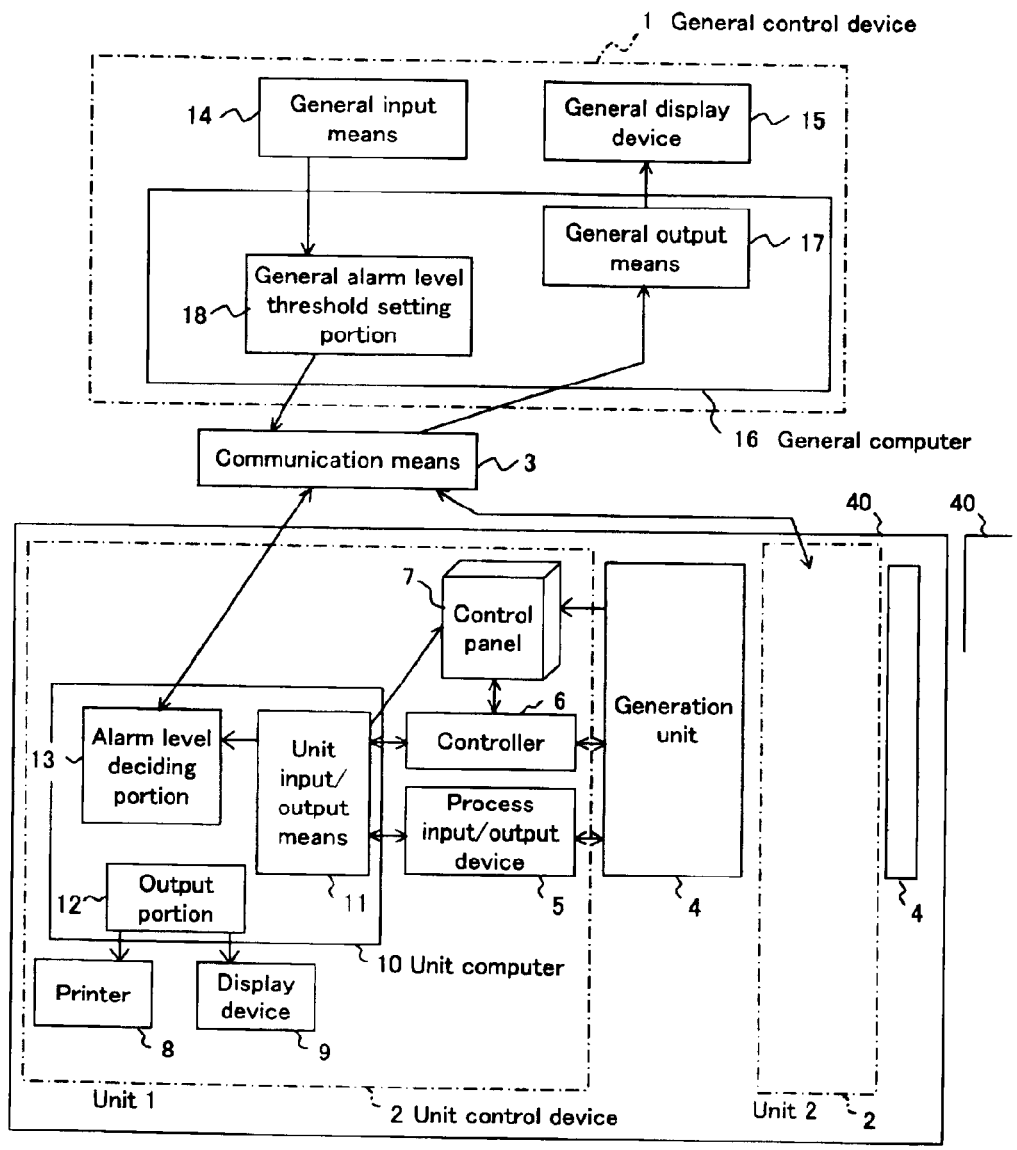
FIG. 1 is a block diagram of a first embodiment of a system for operating a plurality of power generation stations according to the present invention.

A first embodiment of the invention is now described with reference to FIGS. 1–7. With reference to FIG. 1, a general control device 1 is for monitoring and controlling a plurality of electric power generation stations 40 through communication means 3. Each of the electric power generation stations comprises at least one electric power generation unit 4. Therefore, the a general control device 1 is for monitoring and controlling a plurality of electric power generation units 4

Each one of the generation units 4 has a unit control device 2. The unit control device 2 has a process input/output device 5, a controller 6, a control panel 7, a unit computer 10, a printer 8 and a display device 9. The unit computer 10 has a unit input/output means 11, an output portion 12 and an alarm level deciding portion 13.

The general control device 1 has a general computer 16, general input means 14 and a general display device 15. The general computer 16 has a general output means 17 and general alarm level threshold setting portion 18.

The unit input/output means 11 of the unit computer 10 receives process state data of the generation unit 4 such as temperatures, flow rates and state of the valves through the controller 6 and/or the process input/output device 5. The process data received by the unit input/output means 11 are then sent to the alarm level deciding portion 13 of the unit computer 10.

The alarm level deciding portion 13 decides whether each of the process data is in an alarm condition or not by comparing the process data with its corresponding limit. When a data turns into an alarm condition, or it returns to a non-alarm or normal condition, a massage is printed out by the printer 8 or displayed on the display device 9 through the output portion 12.

The alarm level deciding portion 13 further compares the alarm level of the data with the preset alarm level threshold set by the general alarm level threshold setting portion 18 of the general computer 16 of the general control device 1. When the alarm level of the data is higher than the preset alarm level, the data is sent to the general control device 1 via the communication means 3.

The data sent from the alarm level deciding portion 13 to the general control device 1 goes to the general output means 17 in the general computer 16, and then, an alarm massage is displayed on the general display device 15.

Now the general alarm level threshold setting portion 18 and the alarm level deciding portion 13 are described in detail referring to FIGS. 2–7 below.

Figure 2:
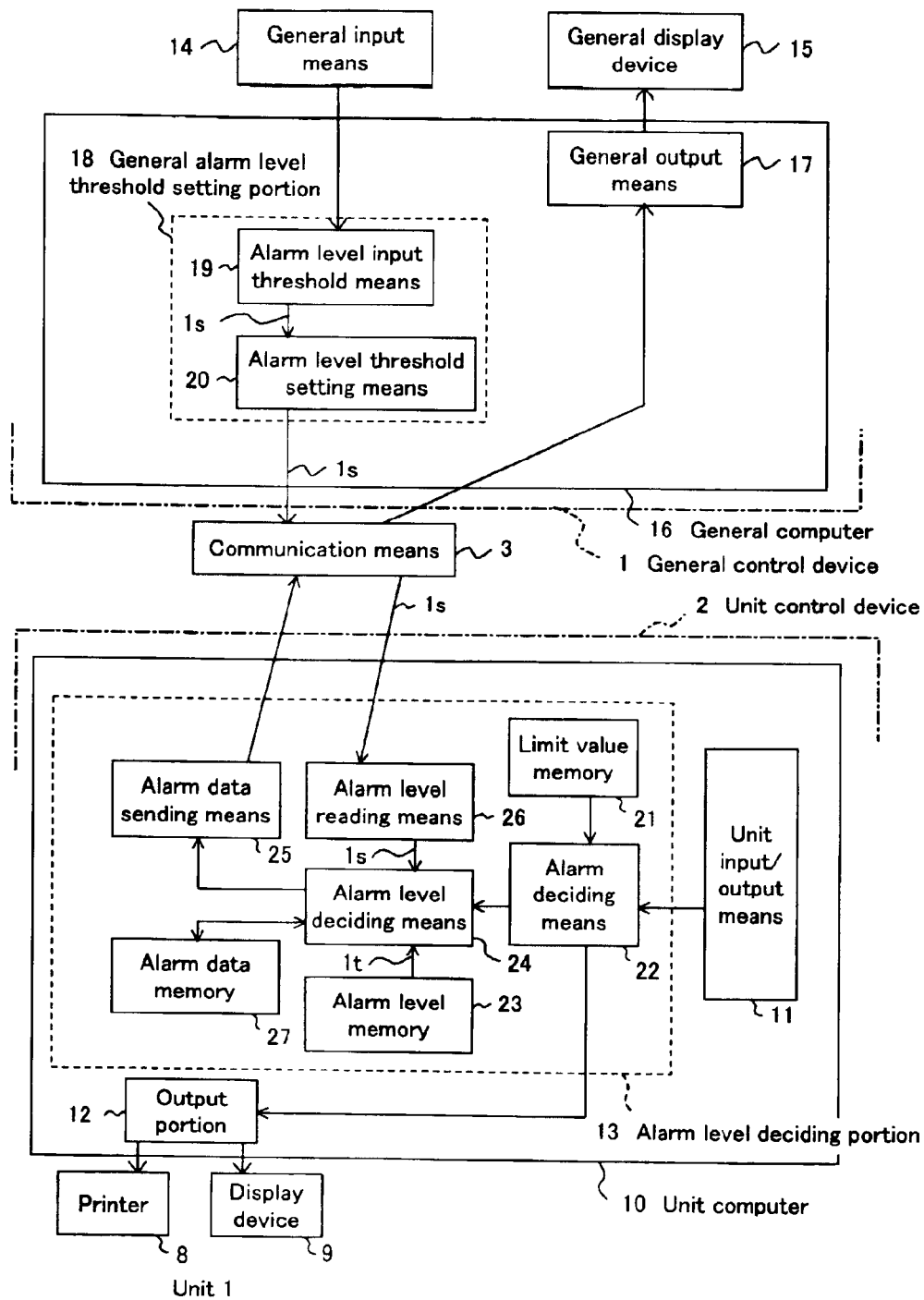
FIG. 2 is a block diagram of the system shown in FIG. 1, with detailed feature of the alarm level threshold setting part in the general control device and of the alarm level deciding portion in a unit control device.

Referring to FIG. 2, the general alarm level threshold setting portion 18 has level input means 19 and alarm level threshold setting means 20. An alarm level threshold 1s is inputted through the input means 14 such as a keyboard, console or a touch screen, and the data is sent to the alarm level threshold setting means 20 via the level input means 19. The alarm level threshold stipulates the importance level over which the alarm data should be monitored at the general control device 1.

The alarm level threshold 1s is sent from the alarm level threshold setting means 20 to the alarm level deciding portion 13 of the unit computer 10 of the unit control device 2 via the communication means 3.

The alarm level deciding portion 13 has a limit value memory 21, alarm deciding means 22, an alarm level memory 23, alarm level deciding means 24, alarm data sending means 25, alarm level reading means 26 and an alarm data memory 27.

The alarm level threshold is sent from the alarm level threshold setting means 20 via the communication means 3 is received by the level reading means 26 of the alarm level deciding portion 13.

Process data of the generation unit received by the unit input/output means 11 is sent to the alarm deciding means 22. The alarm deciding means 22 also receives limit values for process data from the limit value memory 21. The alarm deciding means 22 decides whether process data of the generation unit such as pressures, flow rates and temperatures are within their limit values received from the limit value memory 21. When a process data is decided to be out of its limit, the data is decided to be in an alarm condition.

When the data has come to a new alarm condition or when the data has returned to a normal condition from an alarm condition, the alarm deciding means 22 sends a massage to the printer 8 and the display device 9 via the output portion 12, while the alarm deciding means 22 also sends a signal to the level deciding means 24. The level deciding means 24 selects an alarm level it from the alarm data memory 27 corresponding to the received data. The alarm data selected by the level deciding means 24 is sent to the alarm data memory 27 and is stored there as the current alarm data of the unit. An example of a list of the current alarm data of the unit stored in the alarm data memory 27 is shown in FIG. 3.

The level deciding means 24 compares the alarm level it with the alarm level threshold is set by the general alarm level threshold setting portion 18.

When the preset alarm level 1t is beyond the alarm level threshold is to be monitored, the alarm is decided to be monitored by the general control device 1, and the alarm data is sent to the alarm data sending means 25. The alarm data sending means 25 then sends the alarm data to the general control device 1 via the communication means 3.

When the preset alarm level 1t is within the alarm level threshold 1s to be monitored, the alarm data is discarded as not-necessary to be monitored in the general control device.

For example, when the alarm level threshold 1s is set to be "3" in the general control device 1, the level reading means 26 reads the "3" from the alarm level deciding means. The alarm level is defined corresponding to the importance of the alarm data, wherein the most important level is defined as "1" and the least important level is defined as "6" for example. When a plant data, the main steam temperature for example, which has been read out via the unit input/output means 11 is decided to have turned into an alarm condition by the alarm deciding means 22, the fact is informed of to the level deciding means 24.

The level deciding means 24 then retrieves a preset alarm level for the main steam temperature from the level memory 23, and adds a set of data of the main steam temperature to the alarm data memory 27.

FIG. 3 shows an example of an alarm data list stored in the alarm data memory 27 before the set of data of the main steam temperature is added, while FIG. 4 shows the alarm data list after the set of data of the main steam temperature is added.

If the preset alarm level for main steam is "1", it is beyond the alarm level "3" which has been preset by the general alarm level threshold setting portion 18 to be monitored. Then the alarm data of the main steam temperature is decided to be sent to the general control device 1, and the alarm data sending means 25 sends the alarm data to the general control device 1 via the communication means 3.

The level deciding means 24 then causes the alarm data sending means 25 to delete the alarm massages displayed on the general display device 15 of the items "1A059" and "1A087" shown in FIG. 3, because the alarm levels of those items are "4" and "6" respectively, and they are not beyond the alarm level of "3". The alarm massages displayed on the general display device 15 are then changed from the image shown in FIG. 5 to the image shown in FIG. 6, for example. Those images show items in alarm conditions in chronological order. The images also include the alarm level threshold for each generation unit for monitoring.

If the alarm monitoring level for the first unit is changed from "3" to "1" and that for the third unit from "no alarm-level setting" where all data are to be monitored to "1", the alarm massages on the display device 15 on the general control device changes from the image shown in FIG. 6 to the image shown in FIG. 7.

In operation of the first embodiment of the operation system described above, when there are operators at a first unit control device 2, monitoring the first unit in detail at the general control device 1 may be omitted. In this case, the alarm level threshold for monitoring the first generation unit is set "1", and only the most important alarm data are displayed at the general control device 1. On the other hand, when there are not operators at the first unit control device 2 during a steady state operation for example, the general control device 1 has to monitor the first unit in detail. Detail monitoring can be performed by supplying all alarm data of the first generation unit to the general control device 1 by setting the alarm level threshold to be monitored to be "6" or "no alarm-level threshold setting".

Now referring to FIGS. 8–15, second to fourth embodiments of the present invention are described below. In the drawings, similar elements are referred to the common numerals, and repetitive description is omitted.

Figure 8:
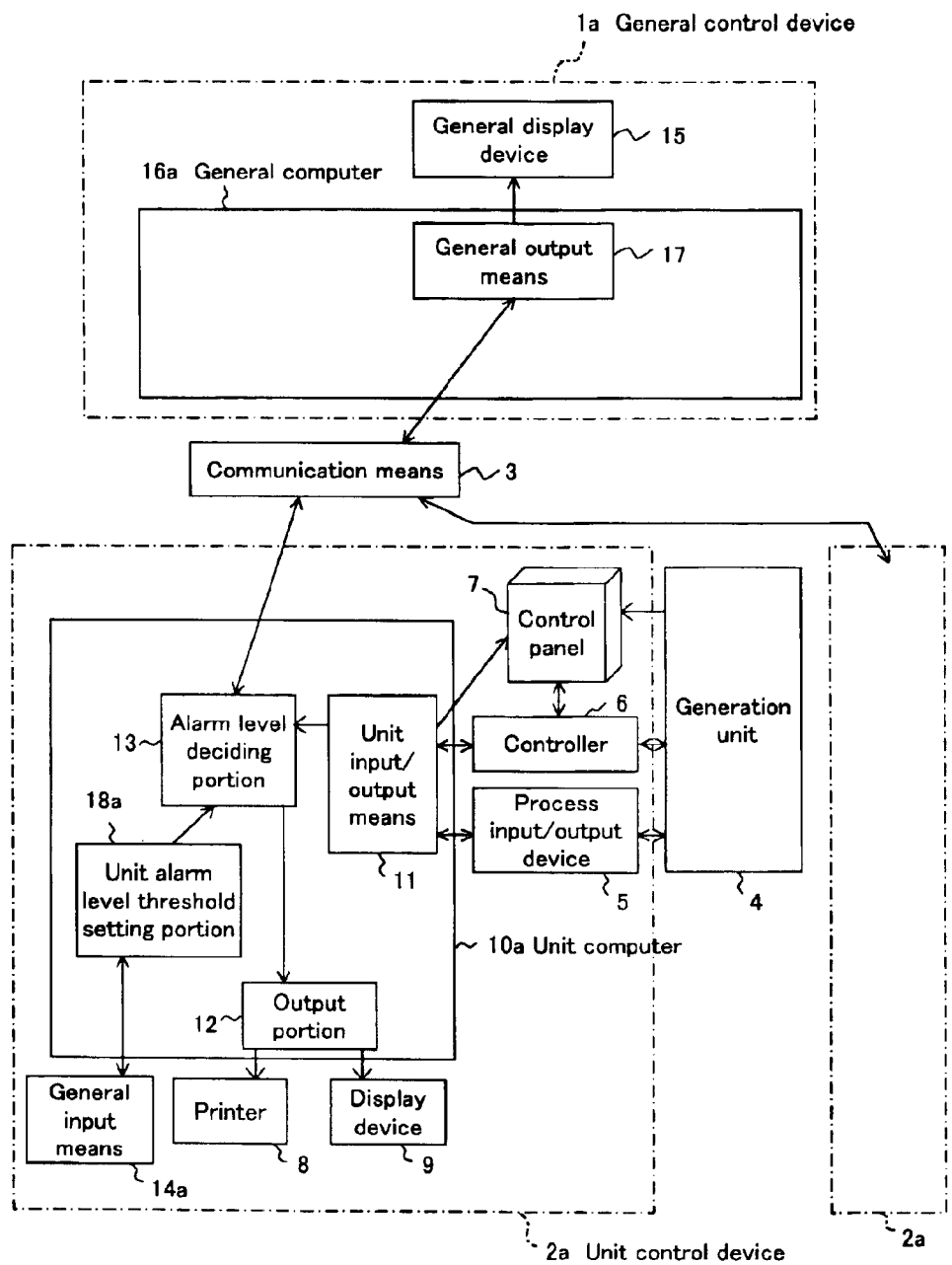
FIG. 8 is a block diagram of a second embodiment of a system for operating a plurality of power generation stations according to the present invention.

Referring to FIG. 8, a second embodiment is now described. A unit control device 2a is similar to the control device 2 shown in FIG. 1 except that it has a unit input means 14a. A unit computer 10a is similar to the unit computer 10 shown in FIG. 1 except that it has a unit alarm level threshold setting portion 18a. A general control device 1a is similar to the general control device 1 shown in FIG. 1 except that it does not have a general input means 14 shown in FIG. 1. A general computer 16a is similar to the general computer 16 shown in FIG. 1 except that it does not have a general alarm level threshold setting portion 18 shown in FIG. 1.

The alarm level threshold of each generation unit for monitoring at the general control unit 1a can be set in the unit alarm level threshold setting portion 18a through the unit input means 14a in the unit control device 2a. When the alarm level threshold "n" is set in the unit alarm level threshold setting portion 18a, the information of the level threshold "n" is sent to the alarm level deciding portion 13. The alarm level deciding portion 13 selects the alarm data which is beyond the level "n", and sends the selected alarm data to the general control device 1a via the communication means 3.

Thus, the massage displayed on the display device 15 of the general control device 1a can be changed depending on the alarm level stipulated at the unit control device 2. This embodiment is particularly effective when each unit of a newly built power station must be monitored in detail.

As a combination (not shown) of the first and second embodiments, each of the general control device 1, 1a and the unit control device 2, 2a may have its own alarm level threshold setting portion 18, 18a with its input means 14, 14a. In this case, one of the two alarm level threshold setting portions may have a priority depending on the state of the generation unit so as to evade confusion when the two alarm level threshold setting portions send contradictory requests.

For example, during normal operation, an alarm level of "3" is set at the unit alarm level threshold setting portion of the unit control device, and the same level "3" is set at the general alarm level threshold setting portion of the general control device. When an abnormal event occurs at a generation unit, the particular unit in abnormal condition must be monitored in detail. In this case, the general alarm level threshold setting portion of the general control device may change the alarm level threshold for the generation unit in the abnormal condition from "3" to "6"(or "no alarm-level threshold setting"), while changing the alarm level threshold for the other generation units from "3" to "1". Thus the generation unit in the abnormal condition can be monitored in detail, while the other generation units are monitored in less detail. At that time, the alarm level threshold stipulated by the general control device has a priority. Thus, the display for monitoring at the general control device can be changed properly based on the importance of the alarm data in view of the general control device and the unit control devices.

Thus, suitable set of the alarm data of each generation unit can be selected and displayed on the general display device 15. Then the general control device 1a and each of the unit control device 2a can be properly and efficiently assigned to with their set of data for monitoring.

Figure 9:
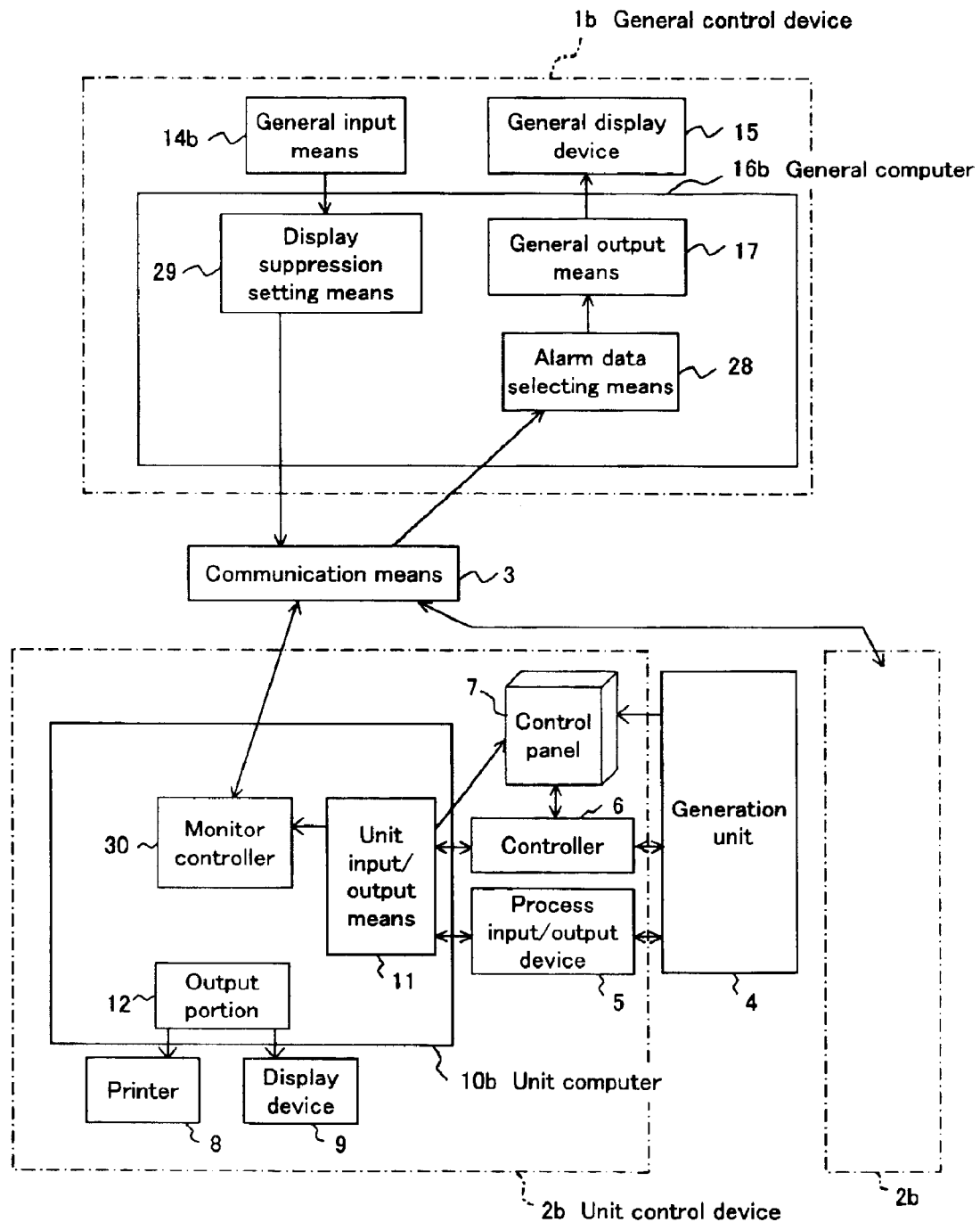
FIG. 9 is a block diagram of a third embodiment of a system for operating a plurality of power generation stations according to the present invention.

Referring to FIG. 9, a third embodiment is now described. A general computer 16b is similar to the general computer 16 shown in FIG. 1 except that it has alarm data selecting means 28 and display suppression setting means 29, and that it does not have a general alarm level threshold setting portion 18 shown in FIG. 1. A unit computer 10b is similar to the unit computer 10, except that it has a monitor controller 30, and that it does not have an alarm level deciding portion 13 shown in FIG. 1. The other features of a general control device 1b, an input means 14b and a unit control device 2b are similar to those of the general control device 1, the input means 14 and the unit control device 2 shown in FIG. 1, respectively.

The monitor controller 30 in the unit computer 10b decides whether each of the data received from the generation unit 4 through the unit input/output means 11 is in an alarm condition or not. When the data has turned into an alarm condition or when the data has returned from an alarm condition to a normal condition, the monitor controller 30 sends a message informing the event to the printer 8 and the display device 9 via the output portion 12. The message is also sent to the general control device 1b via the communication means 3.

The message sent to the general control device 1b is received at the alarm data selecting means 28 of the general control device 1b, where the alarm data is stored and is selected for display. The display suppression setting means 29 causes the alarm data selecting means 28 decide whether each of the alarm data sent from the unit control devices 2b and stored in the alarm data selecting means 28 belongs to the display suppression table. If the alarm data is decided to belong to the display suppression table, the alarm data is made into a display suppression condition and is deleted from display on the general display device 15 via the general output means 17.

Now the operation of the general control device 1b is discussed in detail. FIG. 10 shows an example of the alarm data table stored in the alarm data selecting means 28. Then, a display suppression request of "1B000 of Unit 2" may come through the input means 14b. The request is sent to the alarm data selecting means 28 via the display suppression setting means 29. The alarm data selecting means 28 searches for "Unit number=2" and "Point ID=1B000". When a point satisfying the condition is found, the display suppression index is set "1" as shown in FIG. 11. The fact that the item of "1B000 of Unit 2" exists in this table means that this item is already displayed on the general display device 15. Then, a request for deleting the alarm message on "1B000 of Unit 2" is sent to the general output means 17, and the alarm message is deleted from the general display device 15.

When the display-suppressed point "1B000 of Unit 2" is to be monitored again, a request for re-monitoring is sent from the input means 14b to the alarm data selecting means 28 via the display suppression setting means 29. Then, the alarm data selecting means 28 searches for the point of "1B000 of Unit 2" in the stored alarm data table, changes its display suppression index from "1" to "0", and causes the general output means 17 to display the alarm massage at the point of "1B000 of Unit 2" on the general display device 15.

When a new alarm data is sent from any one of the unit control devices 2b to the alarm data selecting means 28, the alarm data selecting means 28 adds the new alarm data in the stored alarm data table such as a table shown in FIG. 10. When a message of returning to normal condition is received, the alarm data selecting means 28 delete the item from the stored alarm data table.

For example, when a point of a generation unit has turned into an alarm condition, the general control device 1b may send a request to the generation unit for urgent repair of the alarm point. During repairing operation in the generation unit, the general control device 1b may suspend monitoring by setting the point as a display-suppressed item in the display suppression setting means 29. Then the alarm data on that point is deleted from the display data on the general display device 15.

According to the embodiment described above, monitoring by the general control device 1b can be suspended or resumed depending on the requirement, and can evade wasteful double monitoring of both the general control device 1b and the unit control device 2b. Besides, useless monitoring data can be deleted in the general control device 1b.

Figure 12:
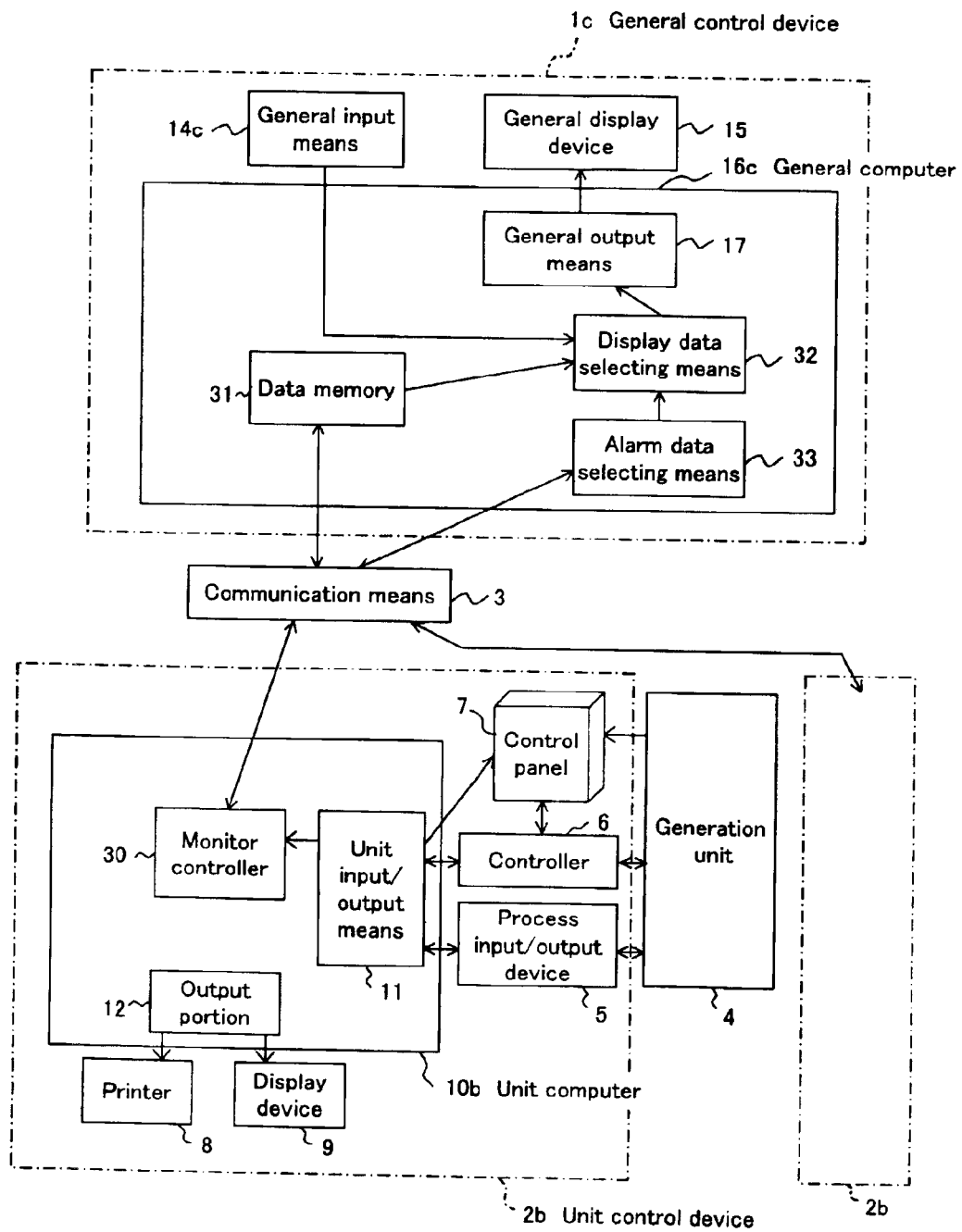
FIG. 12 is a block diagram of a fourth embodiment of a system for operating a plurality of power generation stations according to the present invention.

Referring to FIG. 12, a fourth embodiment is now described. A general computer 16c is similar to the general computer 16b shown in FIG. 9 except that it has a data memory 31, display data selecting means 32 and alarm data selecting means 33, and that it does not have alarm data selecting means 28 and display suppression setting means 29 shown in FIG. 9. The other features of a general control device 1c and an input means 14c are similar to that of the general control device 1b and the input means 14b shown in FIG. 9, respectively.

The general control device 1c displays an image for monitoring each generation unit on the general display device 15, and the request for display is input through the input means 14c. The input means 14c receives a command stipulating at least one operation phase—starting/stopping phase, out-of-operation phase or rated operation phase—of the generation units to be displayed. The request is sent from the input means 14c to the display data selecting means 32.

The display data selecting means 32 selects data of the generation units in the stipulated phase out of the alarm data of all generation units and causes the general output means 17 to display the requested alarm data via the general display device 15.

Now the operation of the general control device 1c is discussed in detail.

The monitor controller 30 of the unit computer 10b receives the plant data through the unit input/output means 11, and sends the plant data with their alarm data to the general control device 1c via the communication means 3. The plant data are received by the general control device 1c in the same frequency as they are received by the monitor controller 30. The plant data are then stored in the data memory 31 of the general computer 16c. The alarm data of each unit are stored in the alarm data selecting means 33, as shown in FIG. 13 for example.

FIG. 14 shows an example of an image displayed by the input means 14c for inputting a request for a general monitoring display. The operator at the general control device 1c may choose and input "Alarm display of the units in starting/stopping operation phase", "Alarm display of the units in out-of-operation phase" or "Alarm display of the units in normal operation phase". For example, when the operator selects and inputs "Alarm display of the units in out-of-operation phase", the display request is sent from the input means 14c to the display data selecting means 32, which decides whether operation the phase of each generation unit meets the requested operation phase.

FIG. 15 shows an example of point data table for deciding operation phase of each generation unit. When a request for displaying a certain operation phase is received, the corresponding point information is selected. Then, operation phase of each generation unit is decided by comparing the current state stored in the data memory 31 with the point information. For example, if the second and fourth units are decided to be in out-of-operation phase as the result, the display data selecting means 32 selects alarm data of the second and fourth units from the alarm data selecting means 33, and causes the general output means 17 to display those selected data on the general display device 15.

According to the embodiment described above, the general control device 1c can display the alarm data of only the generation units in a stipulated operation phase. Thus, the number of display data decreases and the burden on the operators are relieved.

Now a fifth embodiment of the invention is described referring to FIGS. 16–22. This embodiment is related to a system for operating a plurality of power generation stations which has been improved in display images shown on the general display device 15 described above, and can be applied to any of the above described embodiments.

Figure 16:
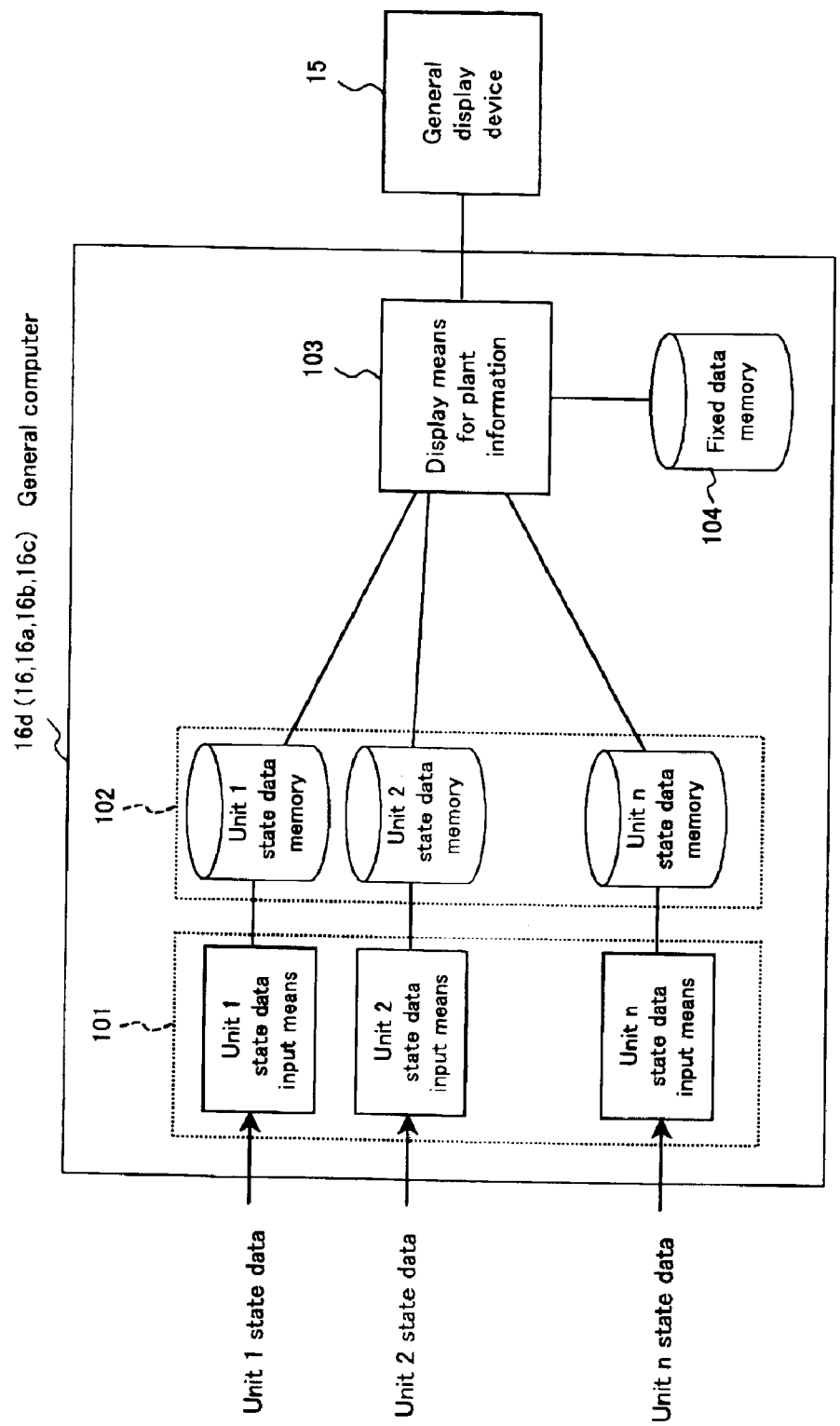
FIG. 16 is a block diagram of a fifth embodiment of a system for operating a plurality of power generation stations according to the present invention.

Referring to FIG. 16, the operation system of this embodiment comprises a display device 15 and a general computer 16d. Those may be similar respectively to the display device 15 and the general computers 16, 16a, 16b, or 16c of the embodiments described before. The general computer 16d has a set of state data input means 101 for the generation units, a set of state data memory 102 for the generation units, display means 103 for plant information and a fixed data memory 104 for the generation units.

State data of each generation units are received by the state data input means 101 for generation units and stored in the state data memory 102 for generation units.

The state data comprises thousands or dozens of thousands of data related to the power generation plants and the controlling/monitoring system, including analog data such as power generation outputs, fuel flow rates, steam pressures, exhaust gas temperatures, and digital data such as valve closed/open signals and alarm signals. The state data may also comprise information of current operation phase of the generation unit (such as: getting ready for start, sea water system starting, vacuum establishing, igniting, load increasing and normal operation) and performance management data related to operation experience and efficiency et al.

Only the state data needed for display out of the all state data may be stored in the state data memory 102. Further, the state data input means 101 and the state data memory 102 may be alternatively located in the unit computers 10 (FIG. 1) or 10a (FIG. 8) rather than in the general computer 16d.

The display means 103 for plant information displays icons (or symbols) representing the generation units and information related to the generation units (as described in detail later) on the display device 15, based on the state data stored in the state data memory 102 and the fixed data in the fixed data memory 104.

The fixed data memory 104 stores fixed data comprising: generation unit data tables including operation modes and the unit names; display pattern setting tables for specifying the shape and color etc. of the displayed icons, operation phase detail display data definition table for specifying the data to be displayed depending on the operation phase (such as "out-of-operation" or "in-operation"); and alarm condition detail display definition table for specifying the data to be displayed in an alarm condition.

Now the setting items for each tables are described referring to FIGS. 17–21. FIG. 17 shows an example of a fixed data table stored in the fixed data memory 104. This table consists of common data which are common to all generation units and unit data which are related to each of the generation units.

The common data defines the number of generation units to be displayed in symbolized icons on the display device 15.

The unit data defines operation mode, name, licensed output power, display location, alarm data location, alarm decision logic number, output power data location and operation phase data location of each generation unit.

The operation mode of a generation unit includes, for example, base load operation, daily start-stop (DSS) operation, weekly start-stop (WSS) operation, seasonal operation and long-term out-of-operation. The licensed output power defines rated electric output power. The display location defines the location of the symbolized icon on the display screen.

The alarm data and the alarm decision logic are used to detect occurrence of an abnormal condition of a generation unit. A data indicating a change of state of a generation unit such as occurrence of an abnormal condition is referred to as an event data. Event data are usually digital data ("on/off" data). On the other hand, data which change continuously (in analog fashion) or step by step and which represent current state of the generation unit are referred to as plant data.

The alarm data location defines the location of an event data indicating an alarm condition in the state data memory 102. The alarm decision logic number defines the logic number based on which alarm condition is decided.

The generation power output data location and the operation phase data location define the locations of those plant data in the state data memory 102.

FIG. 18 shows an example of a display pattern setting table stored in the fixed data memory 104. The display pattern setting table is commonly applicable to all the generation units and defines symbolized icons, colors and flickering characteristics corresponding to the operation mode, alarm condition and operation phase. In case of the example shown in FIG. 18, the shapes of the icons change depending on the operation modes, and the color and the flickering condition of the icons change depending on the operation phase and the alarm condition of the units. For example, the icons are gray when the units are out-of-operation, and they are green when the units are in normal operation. The icons are red and flicker when the units are in operation in alarm conditions, and they are gray and flicker when the units are out-of-operation in alarm conditions.

FIG. 19 shows an example of a table for defining detail display depending on the operation phases of the generation units. This table is also stored in the fixed data memory 104. This table defines locations in the state data memory 102, of the detail parameters to be displayed, based on the operation phase of each of the generation units. Parameters which are important for each operation phase are designated in this table. For example, "estimated time until the next plant start-up" may be designated for units in out-of-operation phase, while parameters related to operation cost such as "plant efficiency" and "power generation output" may be designated for units in operation phase.

The operation phase may be divided into finer phases such as "starting-up phase" and "load increasing phase". The operation phase division criteria may be different for each generation unit by stipulating a unique operation phase display table for each generation unit.

FIG. 20 shows an example of a table for defining detail display depending on the alarm condition of the generation units. This table is also stored in the fixed data memory 104. This table defines locations in the state data memory 102, of the detail parameters to be displayed, when each of the generation units are in an alarm condition. The detail parameters to be displayed in an alarm condition may include the name of the facility in an alarm condition, type of the alarm ("Main steam temperature being high", for example). This table can also be differently stipulated for each generation unit considering the differences in equipment construction, items to be monitored and items to be protected.

Figure 21:
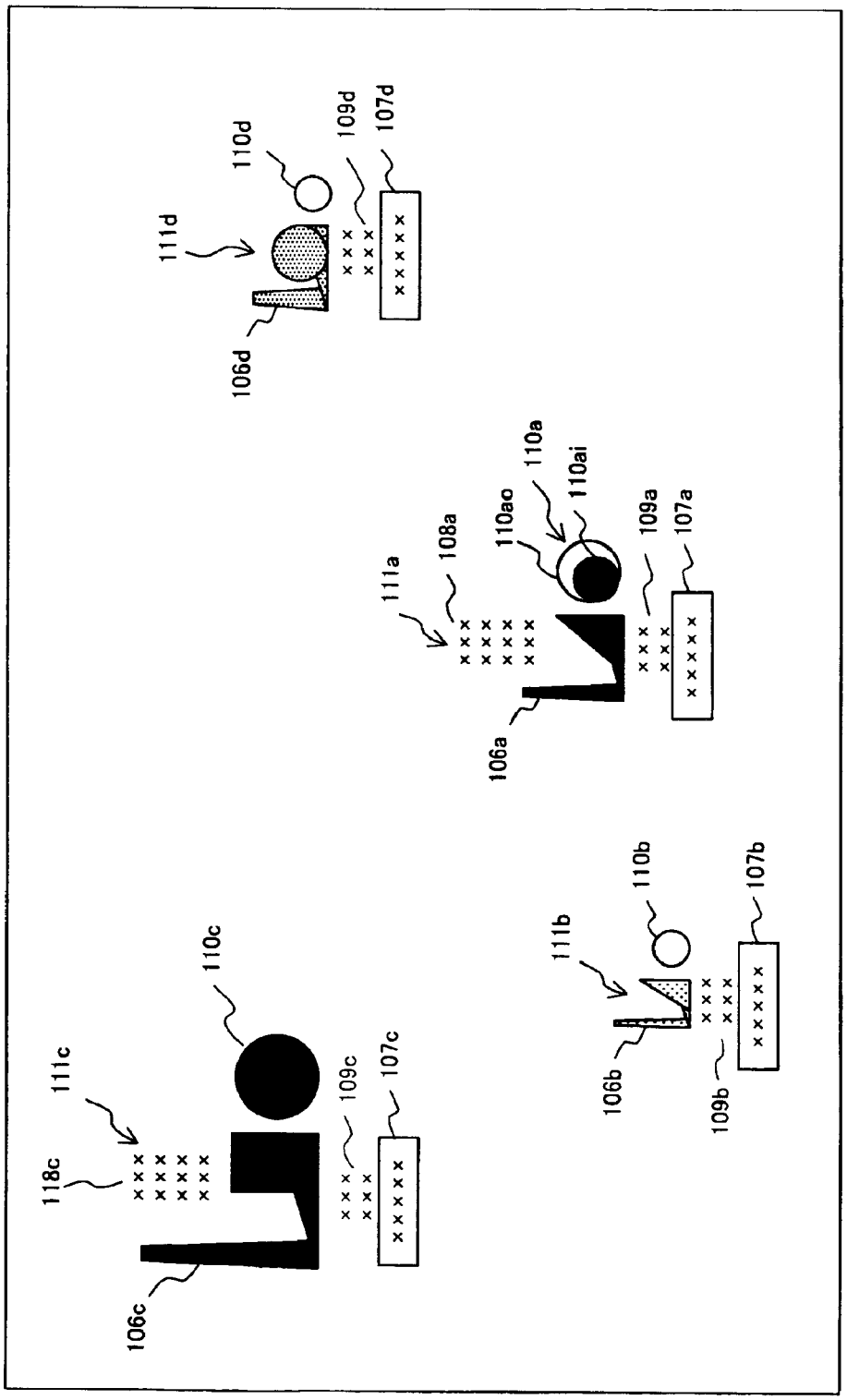
FIG. 21 is an example of an image displayed on the general display device shown in FIG. 16.

FIG. 21 shows an example of an image displayed on the display device 15 by the display means 103. Four generation units 111a, 111b, 111c and 111d are displayed in this case.

Shapes of icons 106a–106d indicate operation modes. The icon 106a indicates a generation unit in base-load operation mode, the icons 106b and 106c indicate generation units in DSS or WSS operation mode, and the icon 106d indicates a generation unit in seasonal operation mode. Sizes of the icons 106a–106d indicate the licensed power outputs of the generation units.

Names of the generation units 111a–111d are displayed below the respective icons 106a–106d.

FIG. 21 shows the displayed image when the generation units 111a and 111c are in alarm conditions. The alarm parameters 108a and 108c are displayed above their respective icons 106a and 106c, and the icons 106a and 106c may flicker for attracting attention. The operation phase parameters 109a–109d are displayed below the respective icons 106a–106d.

Circles 110a–110d shown in FIG. 21 indicate the power generation output of respective units 111a–111d. The circle 110c has a blank outer circle 110ao and a solid inner circle 110ai. The size of the outer circle 110ao indicates the licensed power generation output of the unit, while the size of the inner solid circle 110ai indicates the current power generation output. The solid circle 110c of the unit 111c indicates full power operation, while the blank circles 110b and 110d indicate that the units 111b and 111d are not outputting any power.

Figure 22:
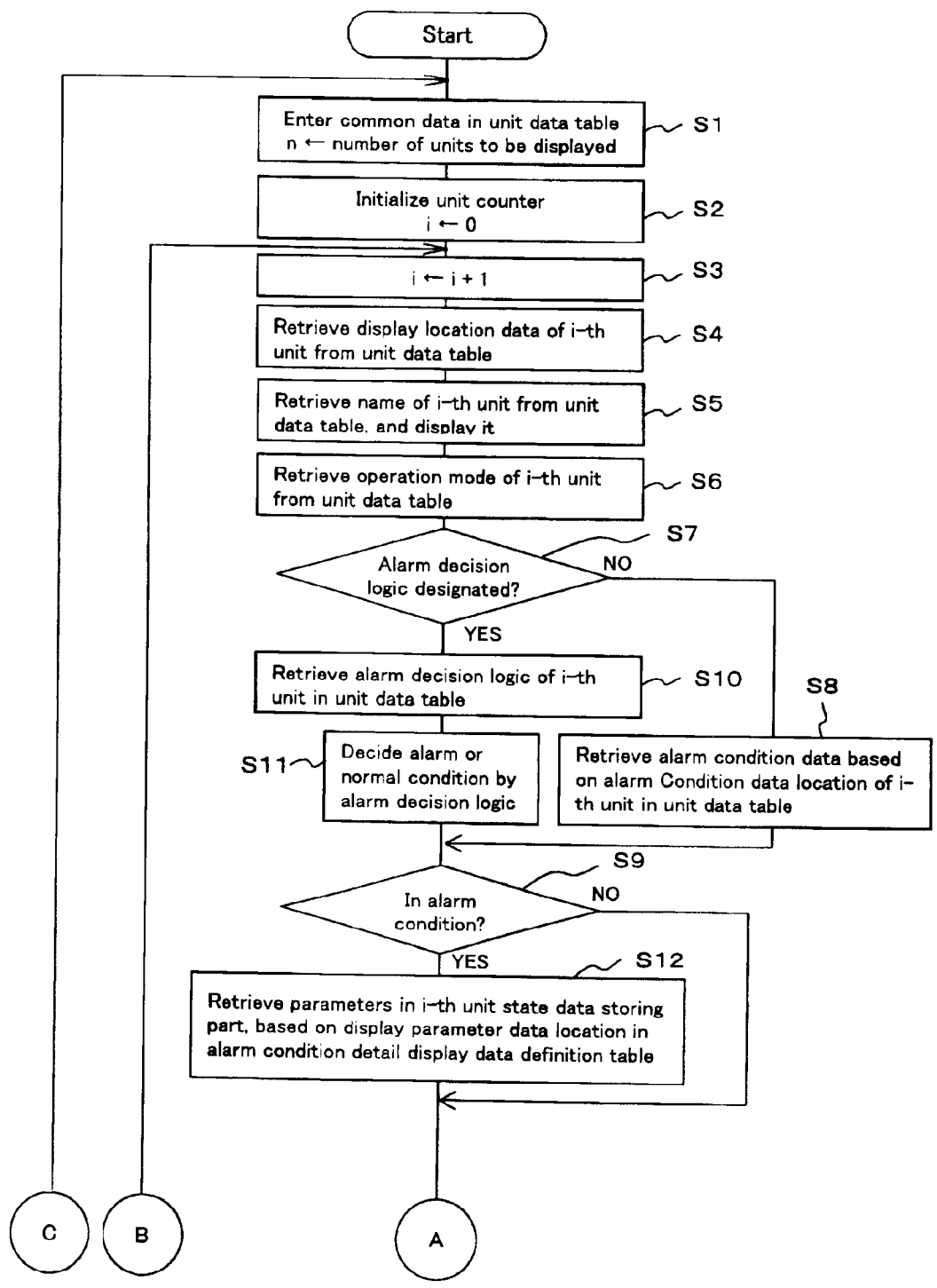
FIG. 22 is a flow diagram of an example of a process for displaying the state of the generation units according to the fifth embodiment of the present invention using the operation system shown in FIG. 16.
Figure 22:
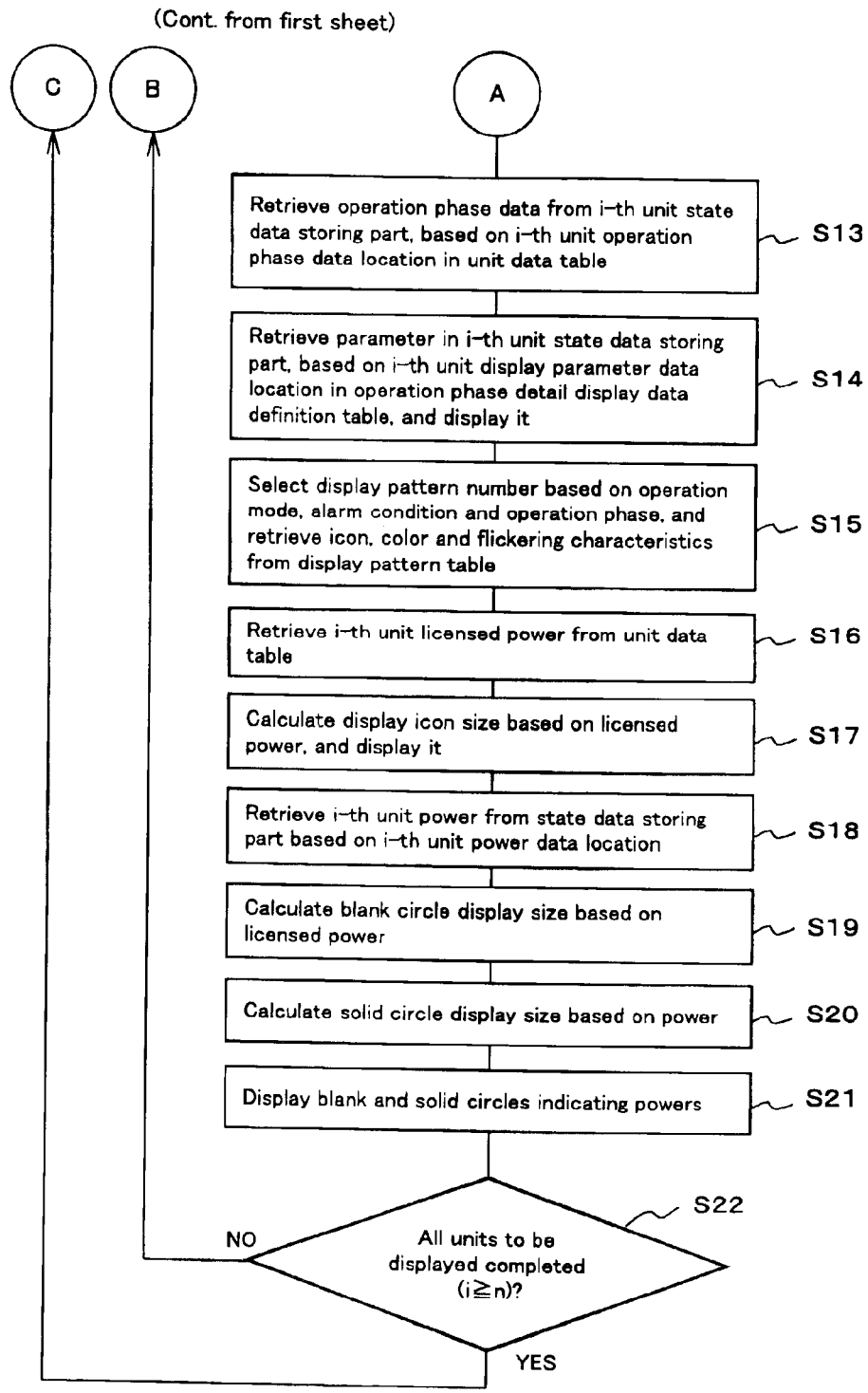

FIG. 22 shows the sequence of a process of the display means 103 according to this embodiment.

First, the display means 103 receives the number "n" of the generation units to be displayed from the data table in the fixed data memory 104 (S1). Then, generation unit counter "i" is initialized by setting i=0 (S2). Then, 1 is added to the generation unit counter "i" for starting display process for the first generation unit (S3).

Then, the data of display location of the generation unit is retrieved from the unit data table (S4). Then, the name of the generation unit is retrieved from the unit data table, and the name 107a shown in FIG. 21 is displayed near the location near the display location retrieved in Step 4 (S5).

Then, the operation mode data is retrieved from the generation unit data table (S6). Then, it is decided whether an alarm decision logic is designated (S7). If an alarm decision logic is not designated, the data of the generation unit in an alarm condition is retrieved from the state data memory 102 based on the alarm condition data location of the unit data table (S8). Then, it is decided whether it is in an alarm condition (S9).

Meanwhile, if an alarm decision logic is decided to be designated in Step 7, the alarm decision logic number is retrieved from the generation unit data table (S10). Then, it is decided whether it is in an alarm condition or in normal condition (S11). Then, it is decided whether it is in an alarm condition or not (S9).

If it is decided that it is in an alarm condition, data locations of the parameters to be displayed in an alarm condition are retrieved from the alarm condition detail display data definition table. Then, parameter data are retrieved from the state data memory 102, and the parameter data in an alarm condition 108a shown in FIG. 21 are displayed near the location of the display location of the generation unit which was retrieved in Step 4 (S12).

Then, the operation phase data is retrieved from the state data memory 102 based on the operation phase data location of the generation unit data table (S13). Then, the data location of the parameter to be displayed at the operation phase is retrieved from the display parameter data of the generation unit in the operation phase detail display data definition table, and the current data of the parameters are retrieved from the state data memory 102. Then, the operation phase parameters 109a of FIG. 21 are displayed near the location of the display location of the generation unit which was retrieved in Step 4 (S14).

Then, a display pattern is decided based on the operation mode retrieved in Step 6, the alarm condition retrieved in Step 12 and the operation phase retrieved in Step 14. Then, the shape, color and flickering characteristics of the icon are retrieved from the display pattern table (S15).

Then, the licensed power output of the generation unit is retrieved from the generation unit data table (S16). Then, the size of the icon to be displayed is calculated based on the licensed power output of the generation unit. Then, the icon 106a, shown in FIG. 21, is displayed at the location retrieved in Step 4. The size of the displayed icon 106a indicates the licensed power output, and its color and flickering characteristics have been retrieved in Step 15 (S17).

Then, the power generation output data is retrieved from the state data memory 102 based on the power output data location in the unit data table (S18). Then, the size of the outer circle indicating the licensed power output of the generation unit is calculated (S19). Then, the size of the inner solid circle proportional to the current power generation output data is calculated (S20). Then, the solid inner circle 110ai indicating the current power output data and the blank outer circle 110ao indicating the licensed power output are displayed as shown in FIG. 21 (S21), which concludes a display of the first generation unit 111a shown in FIG. 21.

Then the process for displaying the next generation unit 111b is started (S22), and the other generation units are displayed likewise.

According to the embodiment described above, all the generation units 111a–111d of different specification can be monitored easily on a single display device, and the number of operators can be reduced.

As a modification of the embodiment described above, the displayed icons can be changed indicating the types of the generation units such as "thermal", "nuclear" or "hydraulic", by adding the data indicating the types to the generation unit data shown in FIG. 17 and adding those data to the display pattern setting table shown in FIG. 18.

As a further modification, the displayed icons can be changed indicating the importance of the generation units, by adding the data indicating the importance of the generation unit data and adding display patterns indicating the importance. For example, the icons to be displayed may be changed depending on the importance of the generation units considering the accumulated power generation or the accumulated times of the start-ups, by adding the accumulated power generation data locations or the accumulated times of the start-ups data locations to the generation unit data tables of the generation units.

As a further modification, in addition to the power output display, other data indicating the current state of the generation units, such as fuel consumption rate, efficiency, percentage of the unit in total power generation rate of the all units controlled by the general controller, and the current excessive power generation rate capability, may be displayed.

As a further modification, the most important information for each of the generation units in the current operation phase may be displayed on the display device 15. For example, estimated time to be required to the start-up may be the most important information for a generation unit out of operation, while information related to the power output or operation cost such as efficiency may be the most important information for a generation unit in operation. When a displayed icon or message is selected or pointed out by the operator, detailed data corresponding to that unit may be displayed.

Now a sixth embodiment of the invention is described referring to FIGS. 23–26. This embodiment may be combined with the fifth embodiment described above, and is applicable to any other embodiments described above.

This embodiment is characterized that a group icon can be selectively displayed representing a group of generation units in place of the icons representing individual generation units.

FIG. 23 shows an example of a group definition table stored in the fixed data memory 104 shown in FIG. 16. As shown in this table, a first group comprises a first to a fourth generation units, a second group comprises a fifth to an eighth generation units, and an m-th group comprises an a-th to a d-th generation units.

Figure 24:
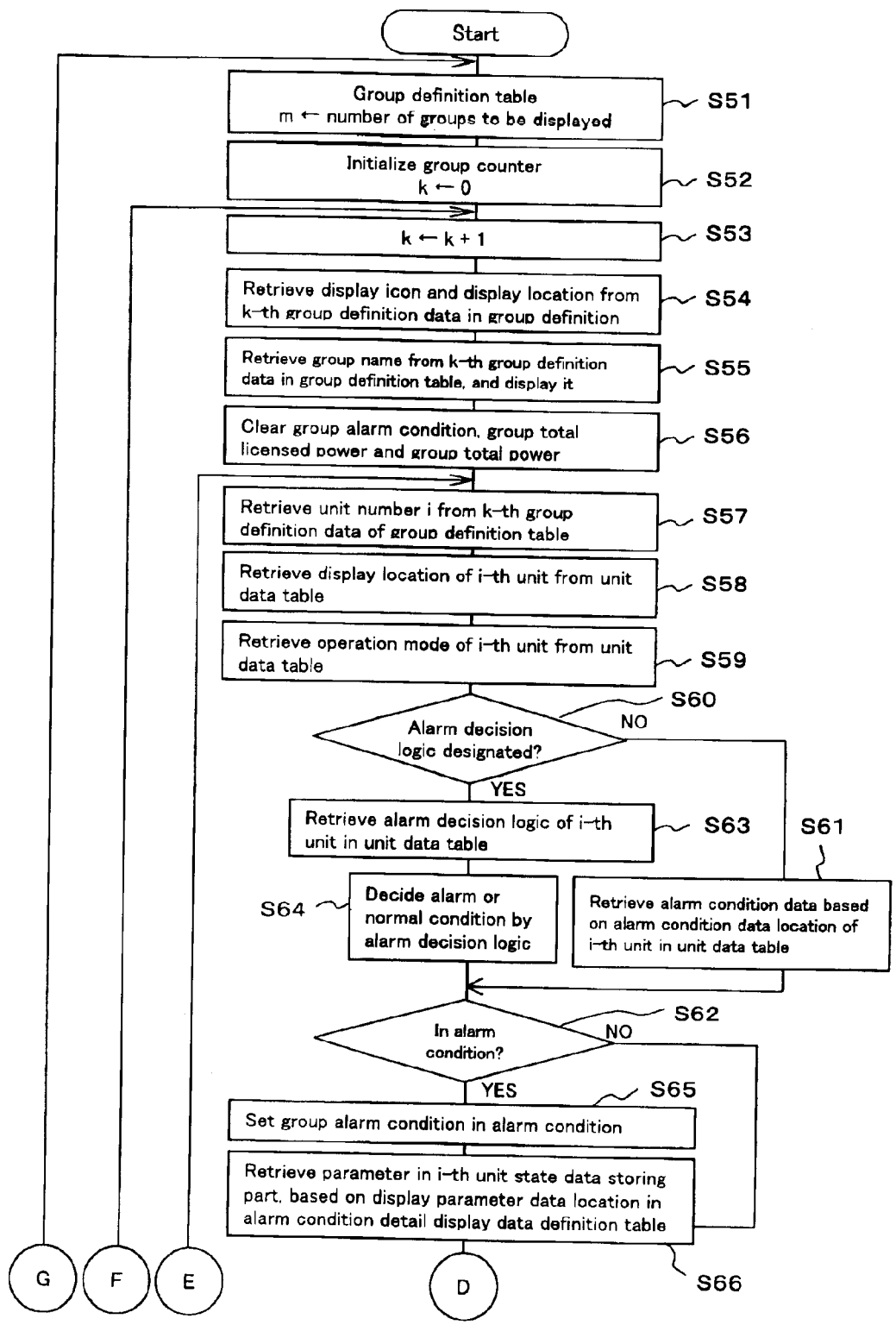
FIG. 24 is a flow diagram according to the sixth embodiment of the present invention using the operation system shown in FIG. 16.
Figure 24:
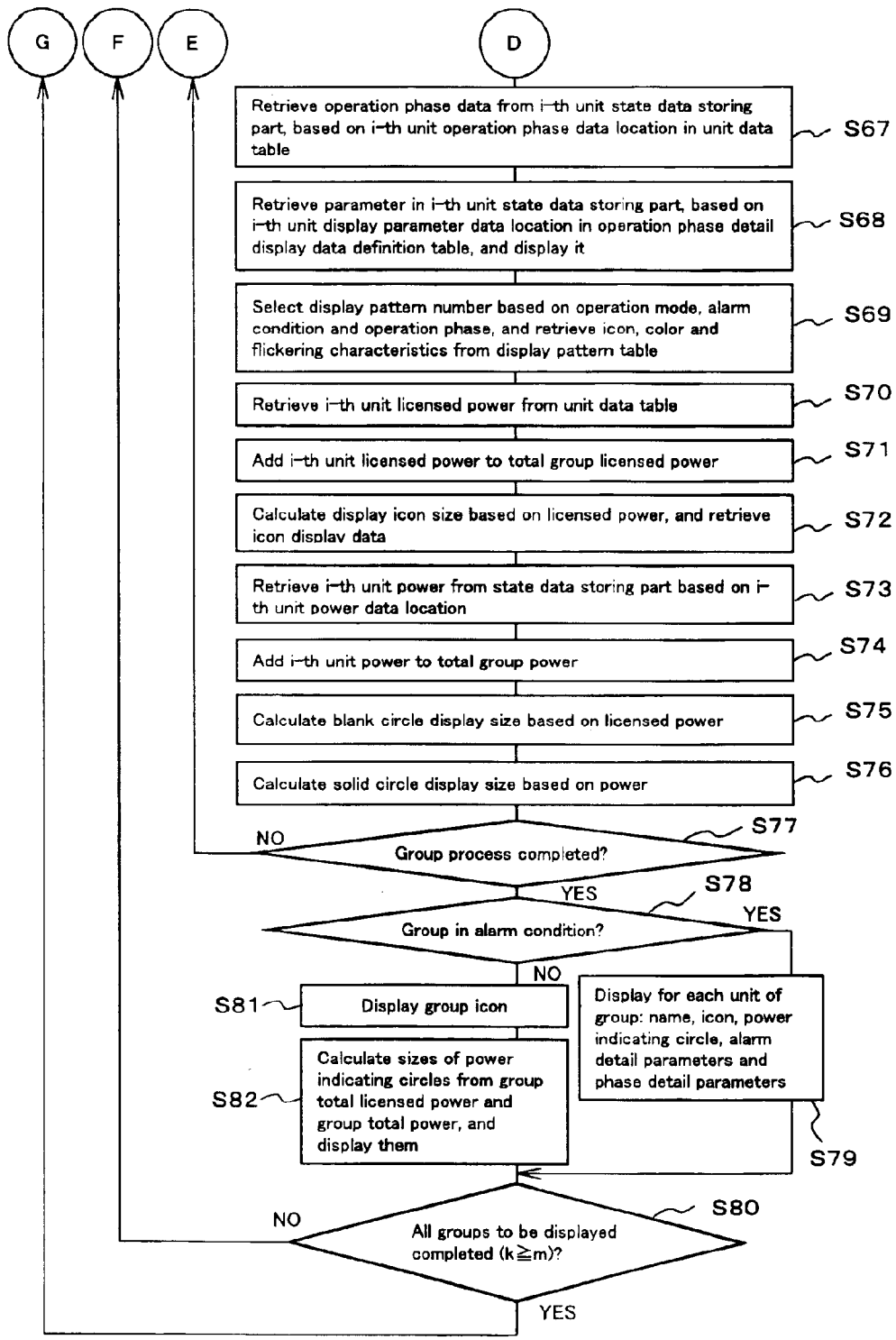

FIG. 24 shows the sequence of a process of the display means 103 according to this embodiment.

First, the display means 103 receives the number "m" of the groups to be displayed from the group definition table in the fixed data memory 104 (S51). Then, group counter "k" is initialized by setting k=0 (S52). Then, 1 is added to the group counter "k" for starting display process for the first group (S53).

Then, an icon to be displayed and a location for the icon to be displayed at are retrieved from the k-th group definition data in the group definition table (S54). Then, a name is retrieved from the k-th group definition data in the group definition table, and the name is displayed near the group location retrieved in Step 54 (S55). Then, the group alarm condition, the group total licensed power output and the group total current power output are cleared (S56).

Then, a generation unit number defined in the group definition table is retrieved (S57). Then, the data of the display location of the generation unit is retrieved from the unit data table (S58). Then, the operation mode data is retrieved from the generation unit data table (S59).

Then, it is decided whether an alarm decision logic is designated (S60). If an alarm decision logic is not designated, the data of the generation unit in an alarm condition is retrieved from the state data memory 102 based on the alarm condition data location of the unit data table (S61). Based on the alarm condition data, it is decided whether it is in an alarm condition (S62).

Meanwhile, if an alarm decision logic is designated in Step 60, the alarm decision logic number is retrieved from the generation unit data table (S63). Then, it is decided whether it is in an alarm condition or in normal condition (S64). Then, it is decided whether it is in an alarm condition or not (S62).

If it is decided that the unit is in an alarm condition, the group alarm condition is set to be an alarm condition (S65). Then, data locations of the parameters to be displayed in an alarm condition are retrieved from the alarm condition detail display data definition table. Then, parameter data are retrieved from the state data memory 102, and the parameter data in an alarm condition are displayed near the location of the display location of the generation unit which was retrieved in Step 54 (S66).

Then, the operation phase data is retrieved from the state data memory 102 based on the operation phase data location of the generation unit data table (S67). Then, the data location of the parameter to be displayed at the operation phase is retrieved from the display parameter data of the generation unit in the operation phase detail display data definition table, and the current data of the parameters are retrieved from the state data memory 102. Then, the operation phase parameters are displayed near the location of the display location of the generation unit which was retrieved in Step 54 (S68).

Then, a display pattern is decided based on the operation mode retrieved in Step 59, the alarm condition retrieved in Step 66 and the operation phase retrieved in Step 67. Then, the shape, color and flickering characteristics of the icon are retrieved from the display pattern table (S69). Then, the licensed power output of the generation unit is retrieved from the generation unit data table (S70). Then, the licensed power output of the generation unit is added to the total licensed power output of the group (S71).

Then, the size of the icon to be displayed is calculated based on the licensed power output of the generation unit, and an icon of the size proportional to the licensed power output to be displayed is retrieved (S72). Then, the power generation output data is retrieved from the state data memory 102 based on the power output data location in the unit data table (S73). Then, the power output of the generation unit is added to the total power output of the group (S74).

Then, the size of the circle to be displayed for indicating the power output is calculated from the licensed power output (S75). Then, the size of the inner solid circle proportional to the current power generation output data is calculated (S76).

Then, it is decided whether the process of the group is completed (S77). When it is not completed, the Steps 57–76 are repeated (S77). When the process of the group is completed, then, it is decided whether the group is in an alarm condition (S78). If the group is in an alarm condition, each generation unit in the group is displayed with detail data including the name, the icon, the circles indicating the power generation, alarm detail parameters and phase detail parameters (S79). Then, the process described above are repeated until all the groups to be displayed are completed (S80).

If the group is decided to be not in an alarm condition in Step 78, the group icon is displayed (S81). Then, the circle indicating the group power outputs is displayed through calculation of the size of the circle based on the total licensed power output and the total current power output of the group (S82).

In this embodiment as described above, during the process of a display group, the alarm condition data of each generation unit are stored in a memory but they are not displayed. When at least one of the generation units in a group is in an alarm condition, the group is classified as in an alarm condition. The sum of the licensed power outputs of all generation units in a group is stored as the group total licensed power output, and the sum of the current power outputs of all generation units in a group is stored as the group total current power output.

When all process on the generation units in a group are completed, the group alarm condition is checked. If it is not in an alarm condition, a group icon is displayed, and a power indicating circle with an area proportional to the power output is displayed. If the group is in an alarm condition, each generation unit in the group is displayed.

Figure 25:
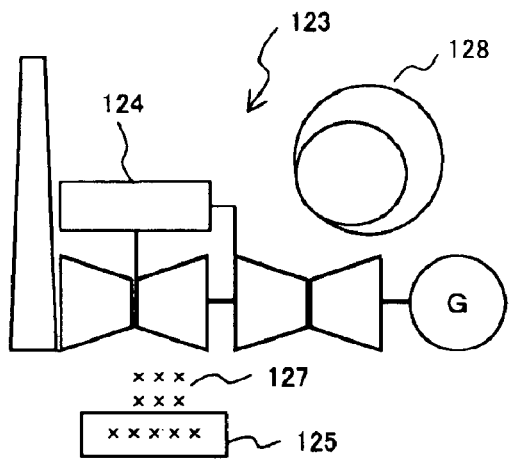
FIG. 25 is an example of an image displayed on the general display device when the group is in a normal condition according to the sixth embodiment of the present invention.
Figure 26:
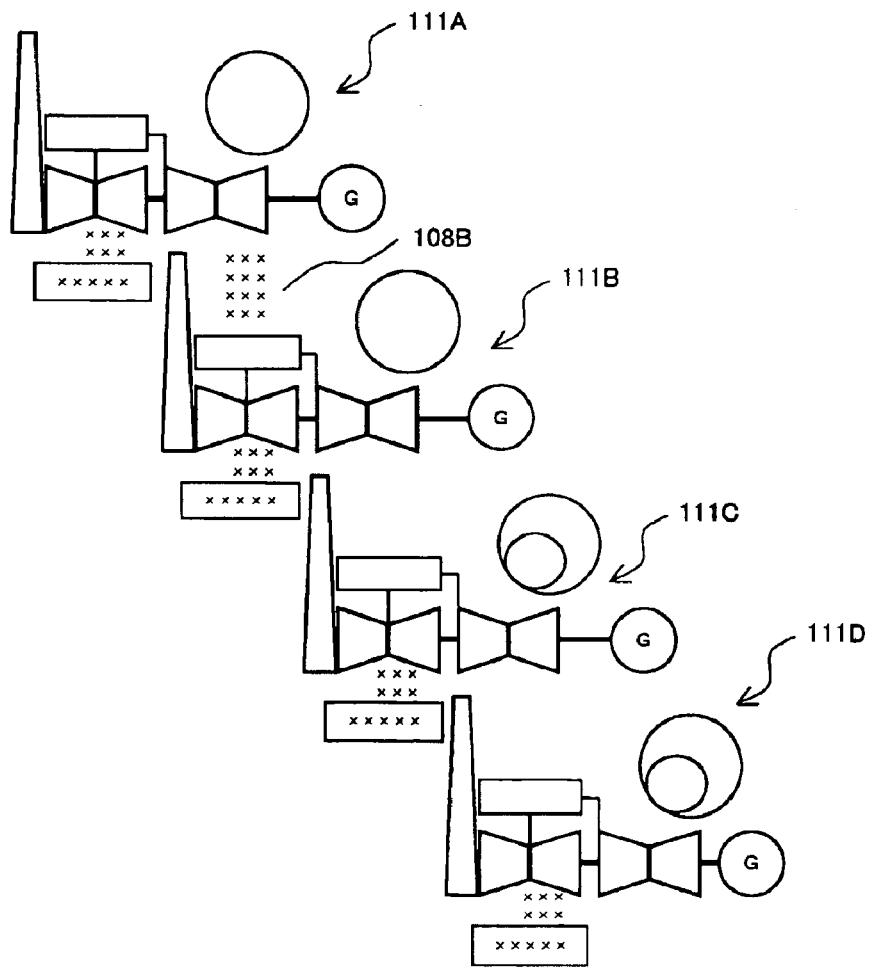
FIG. 26 is an example of an image displayed on the general display device when the group is in an alarm condition according to the sixth embodiment of the present invention.

FIGS. 25 and 26 show an example of images displayed on the display device 15 according to this embodiment. FIG. 25 shows an image when the group is in normal condition. Each unit forming the group 123 is not shown, and an icon 124, a name 125, operation phase parameters 127 and power indicating circles 128 are displayed indicating the group 123. When at least one of the units 111A–111D is in an alarm condition by any abnormality, each of the units are displayed as shown in FIG. 26. This example shows that the unit 111B is in an alarm condition. The alarm message 108B is displayed as a part of the display of the unit 111B, so that the operator may distinguish the equipment of the unit as well as the unit which is in an alarm condition. Thus, the operators at the general control device can easily monitor a plurality of generation units 111A–111D of different specifications, and the number of the operators can be reduced.

Numerous modifications and variations of the present invention are possible in light of the above teachings. It is therefore to be understood that, within the scope of the appended claims, the present invention can be practiced in a manner other than as specifically described herein.

What is claimed is:

1. A system for operating a plurality of power generation stations, the system comprising:
   a general control device for monitoring a plurality of power generation stations, each of the stations including at least one electric power generation unit;
   a plurality of unit control devices, each of which monitoring each of the generation units, the unit control devices producing alarm data, each of the alarm data having its alarm level representing the importance of the alarm data;
   communication means for exchanging data between the general control device and each of the unit control devices;
   alarm level threshold setting means for setting an alarm level threshold for display at the general control device, the alarm level threshold being decided depending upon importance of the alarm data in view of the general control device:
   selecting means for selecting part of the alarm data based on the alarm level and the alarm level threshold: and
   means for displaying the selected part of the alarm data.

2. A system as claimed in claim 1, wherein:
   the alarm level threshold setting means is disposed in the general control device;
   the selecting means is disposed in each of the unit control devices; and
   the selected part of the alarm data are sent to the general control device via the communication means.

3. A system as claimed in claim 1, wherein:
   the alarm level threshold setting means and the selecting means are disposed in each of the unit control devices; and the selected part of the alarm is sent to the general control device via the communication means.

4. A system for operating a plurality of power generation stations, the system comprising:

a general control device for monitoring a plurality of power generation stations, each of the stations including at least one electric power generation unit;

a plurality of unit control devices, each of which monitoring each of the generation units, the unit control devices producing alarm data; and communication means for exchanging data between the general control device and each of the unit control devices;

wherein, only part of the alarm data produced in the unit control devices are displayed at the general control device; and wherein the general control device includes:
specifying means for specifying items out of the alarm data not to display at the general control device;
means for selecting part of the alarm data excluding the alarm data of the items specified by the specifying means from the alarm data sent from the unit control devices via the communication means; and
means for displaying the part of the alarm data selected by the selecting means.

5. A system for operating a plurality of power generation stations, the system comprising:

a general control device for monitoring a plurality of power generation stations, each of the stations including at least one electric power generation unit;

a plurality of unit control devices, each of which monitoring each of the generation units, the unit control devices producing alarm data; and communication means for exchanging data between the general control device and each of the unit control devices;

wherein, only part of the alarm data produced in the unit control devices are displayed at the general control device; and wherein the general control device includes:
input means for stipulating at least one operation phase of the generation units to be displayed at the general control device;
receiving means for receiving alarm data from the unit control devices via the communication means, the alarm data including data indicating the operation phases of the generation units;
means for selecting a first part of the alarm data from the alarm data received by the receiving means;
means for selecting a second part of the alarm data from the first part of the alarm data based on the operation phases of the generation units corresponding to the operation phase stipulated by the input means; and
means for displaying the second part of the alarm data.

6. A general control device for monitoring a plurality of power generation stations, each of the stations including at least one electric power generation unit having a unit control device, the general control device being connected to each of the unit control devices via communication means, the general control device comprising:

input means for stipulating at least one operation phase of the generation units to be displayed at the general control device;

receiving means for receiving alarm data from the unit control devices via the communication means, the alarm data indicating data related to the operation phases of the generation units;

means for selecting first part of the alarm data from the alarm data received by the receiving means;

means for selecting second part of the alarm data from the first part of the alarm data based on the operation phases of the generation units corresponding to the operation phase stipulated by the input means; and means for displaying the second part of the alarm data.

7. A system for operating a plurality of power generation stations, the system including a general control device for monitoring a plurality of power generation units, the device comprising;

means for storing current unit state data of the generation units, the state data being supplied from the generation units;

means for storing fixed data of the generation units for display at the general control device, the fixed data including shapes of unit icons representing the generation units; and display means for displaying the current unit state data including the unit icons at the general control device, the display means utilizing the stored fixed data, the display means including means for changing at least one out of shape, size and color of the displayed current unit state data, based on specification or the current unit state data of the generation units.

8. A system for operating a plurality of power generation stations, the system including a general control device for monitoring a plurality of power generation units, the device comprising:

means for storing current unit state data of the generation units, the state data being supplied from the generation units;

means for storing fixed data of the generation units for display at the general control device; and display means for displaying the current unit state data including unit icons indicating the generation units at the general control device, the display means utilizing the stored fixed data, wherein:
(a) the plurality of the generation units comprises at least one group consisting of a plurality of power generation units; and
(b) the display means includes:
means for selectively displaying a group icon, indicating current state of the group, while suppressing display of the current unit state data of each generation units forming the group; and
means for selectively displaying the current unit state data of each generation units forming the group when required.

9. A system as claimed in claim 8, wherein the display means includes means for displaying current unit state data of each generation unit forming the group when at least one of the generation units forming the group has an alarm data.

10. A system as claimed in claim 8, wherein the icons indicating the generation units which have the alarm data have a common feature different from the feature of the icons indicating the generation units which do not have an alarm data.

11. A method of operating a plurality of power generation units at a single general control device the method comprising the steps of:

receiving, at the general control device, alarm data from the power generation units, each of the alarm data having its alarm level representing the importance of the alarm;

setting an alarm level threshold for display at the general control device, the alarm level threshold being decided upon importance of the alarm data in view of the general control device;

selecting part of the received alarm data based on the alarm level and the alarm level threshold; and displaying the selected part of the alarm data at the general control device.

\* \* \* \* \*